(12) United States Patent
Piona et al.

(10) Patent No.: US 6,173,991 B1
(45) Date of Patent: Jan. 16, 2001

(54) SELF-EMPTYING TANK FLOOR

(76) Inventors: Edward Piona, 24621 Sowles Rd., Acampo; Bobby Satterfield, 1300 E. Victor Rd., Lodi, both of CA (US) 95240; Gobler Pineda, 1021 S. Commerce, Stockton, CA (US) 95206

( * ) Notice: Under 35 U.S.C. 154(b), the term of this patent shall be extended for 0 days.

(21) Appl. No.: 09/315,470

(22) Filed: May 20, 1999

(51) Int. Cl.[7] ........................................... B60P 3/22
(52) U.S. Cl. ........................ 280/837; 280/831; 280/839
(58) Field of Search ................... 296/181, 182, 296/204, 38; 220/1.5, 562, 628, 636; 280/831, 837, 838, 839; D12/96

(56) References Cited

U.S. PATENT DOCUMENTS

| | | | |
|---|---|---|---|
| 4,318,549 | * | 3/1982 | Pletcher ............................... 280/837 |
| 4,350,353 | * | 9/1982 | Van Der Lely ...................... 280/837 |
| 4,406,471 | * | 9/1983 | Holloway ............................. 280/837 |
| 5,127,781 | * | 7/1992 | Roarty et al. ........................ 220/1.5 |
| 5,286,079 | * | 2/1994 | Zubko et al. ......................... 220/1.5 |
| 5,365,980 | * | 11/1994 | DeBerardinis ....................... 220/1.5 |
| 5,671,855 | * | 9/1997 | Norman, Jr. et al. ................ 220/1.5 |
| 5,957,500 | * | 9/1999 | Wade ................................... 280/837 |

FOREIGN PATENT DOCUMENTS

791931 * 8/1937 (FR) ................................... 280/838

* cited by examiner

*Primary Examiner*—Daniel G. DePumpo
(74) *Attorney, Agent, or Firm*—Mark C. Jacobs

(57) ABSTRACT

A floor for a tank formed of a superstructure and a skin, wherein the superstructure is formed of a pair of spaced floor rails, one on the left and one on the right side of the tank, and a spaced series of normally disposed thereto V-trough struts or cross-members each of which slopes from the interior sidewall edges of the tank toward the center longitudinal axis, while at the same time their respective effective elevation is decreased from the back to the front of the tank, such that the skin attached over the superstructure slopes both inwardly toward the middle of the tank from each side and forwardly from the rear of the tank toward the front of the tank.

8 Claims, 6 Drawing Sheets

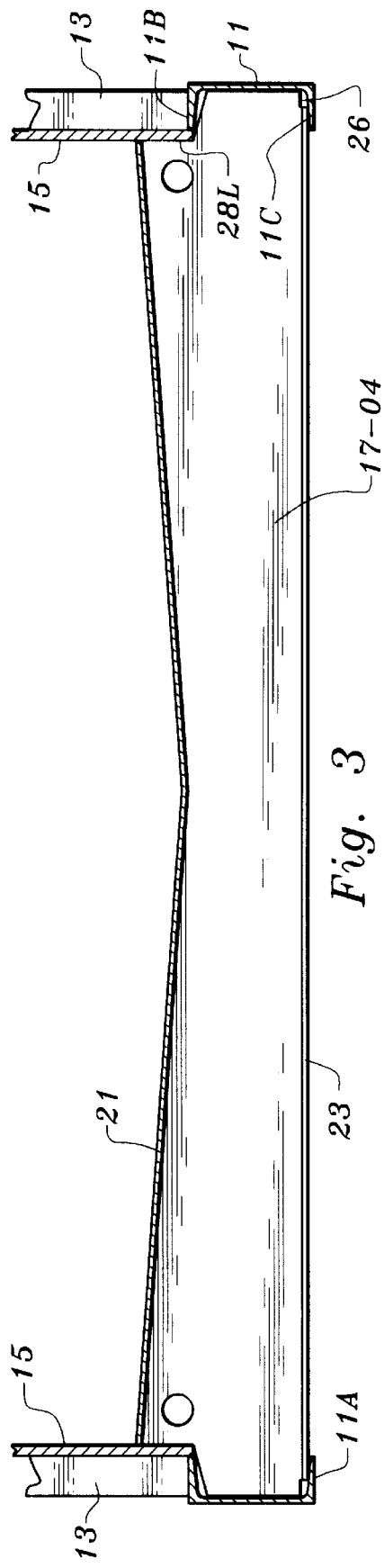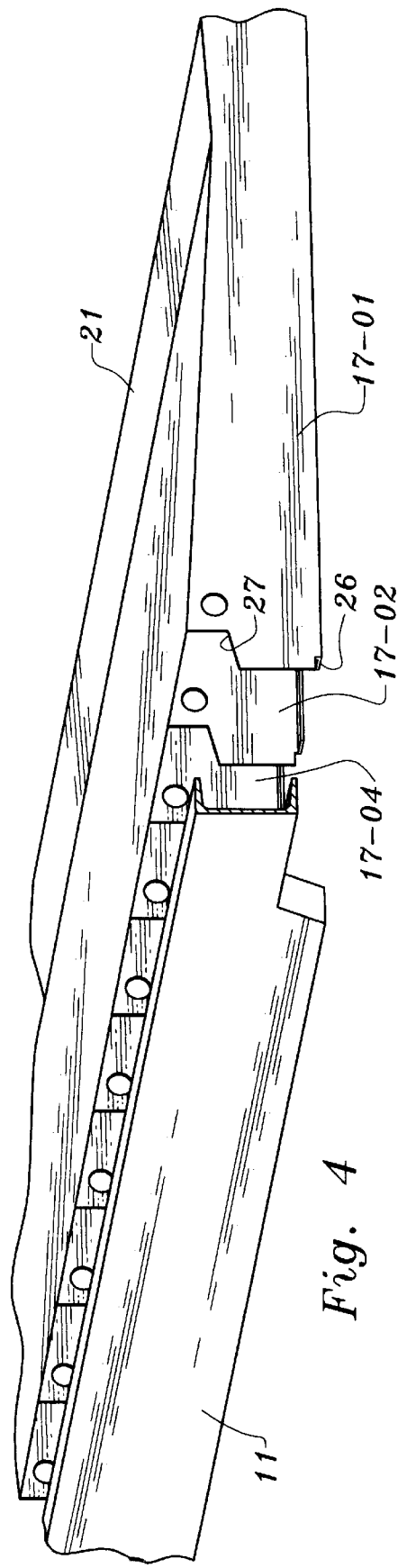

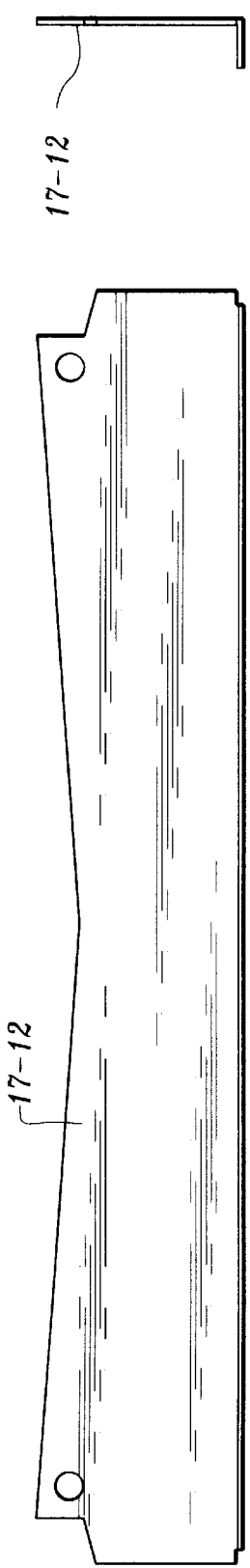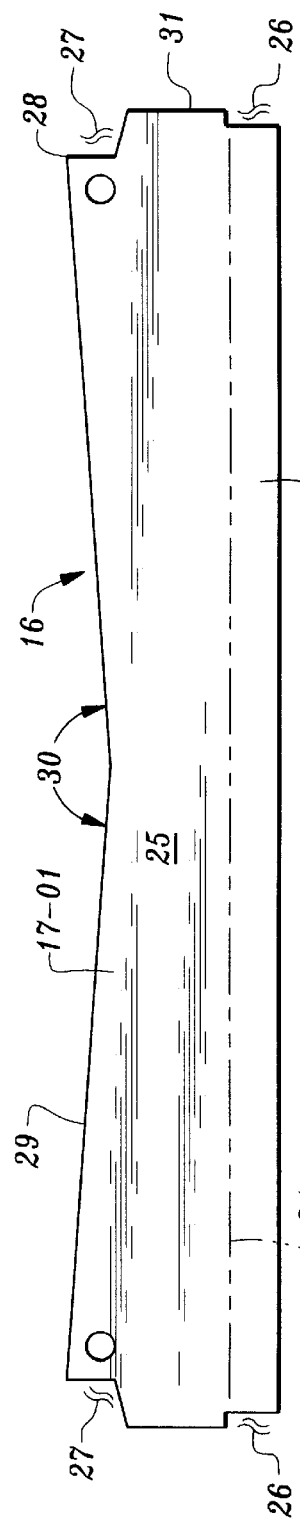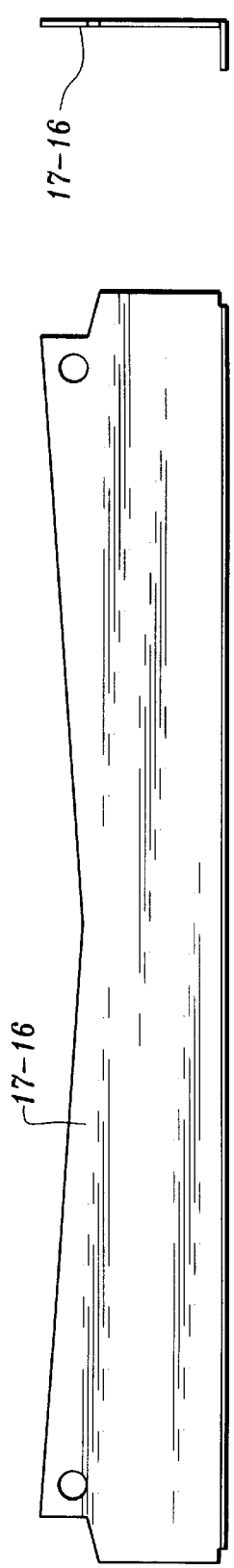

US 6,173,991 B1

SELF-EMPTYING TANK FLOOR

FIELD OF THE INVENTION

This application pertains to a mobile tank's floor structure, adapted to render the emptying and cleaning of the tank significantly easier than for prior art tanks.

BACKGROUND OF THE INVENTION

Mobile tanks for use in the fields and on the road are quite well known. Reference can be made to the following U.S. Patents among others:

Holloway Des. 353,352 Dec. 13, 1994

Schlake Des. 337080 Jul. 6, 1993

Sampelle Des. 147817 Nov. 4, 1947

These tanks are generally four sided with a top and a flat bottom, have two rear wheels on an axle and a hitch for attachment to a tractor, truck cab or other source of pulling power and an exhaust valve at one end. The big problem that has been found to exist in such mobile tanks is the inability of both totally emptying the contents "to the bare floor", and evacuating any liquid such as water or other solvent that may be used to clean the tank's interior. That is, getting all of the fluid in the tank to reach the usually front centrally disposed exhaust valve has been difficult. The task has required the entry of personnel into the tank, or at least the leaning over and into the tank from the side or end thereof to sweep the fluid therein toward the exhaust valve.

In order to cut down on the man hours involved to drain and clean such mobile tanks, and to reduce the risk of accidents as well, the invention of this application came to be.

It is therefore one object to provide a new type of floor for mobile tanks.

It is another object to provide a mobile tank floor that drains in two directions, both toward the center and toward the front at the same time.

It is another object to provide a mobile tank floor that can be fashioned from readily available materials.

It is yet another object to provide a mobile tank floor that is formed of struts of varying heights with a skin overlay.

It is still another object to provide a mobile tank floor that permits total drainage of the liquid contents of the tank.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 3 is a sectional elevational view along line II—II of FIG. 2 at the location of the 4th strut of this invention.

FIG. 4 is a side perspective view at a point in time during the construction of a mobile tank that incorporates the floor of this invention.

FIGS. 11 and 12 are front and end views of the $12^{th}$ strut employed in the floor of this invention.

FIG. 13 is a front view of the plate constituting the blank used to form the $1^{st}$ strut prior to it being bent into shape.

FIGS. 14 and 15 are front and end views of the $16^{st}$ strut.

SUMMARY OF THE INVENTION

A floor for a tank formed of a superstructure and a skin, wherein the superstructure is formed of a pair of spaced floor rails, one on the left and one on the right side of the tank, and a spaced series normally disposed thereto, of V-trough struts or cross-members each of which slopes from the interior edges of the sidewalls of the tank toward the center longitudinal axis, while at the same time their respective effective elevation is decreased from back to front of the tank, such that the skin attached over the superstructure slopes both inwardly toward the middle of the tank from each side and forwardly from the rear of the tank toward the front of the tank. Actual height of the specific strut is dependent on its physical location.

DESCRIPTION OF THE PREFERRED EMBODIMENT

Figure 1:
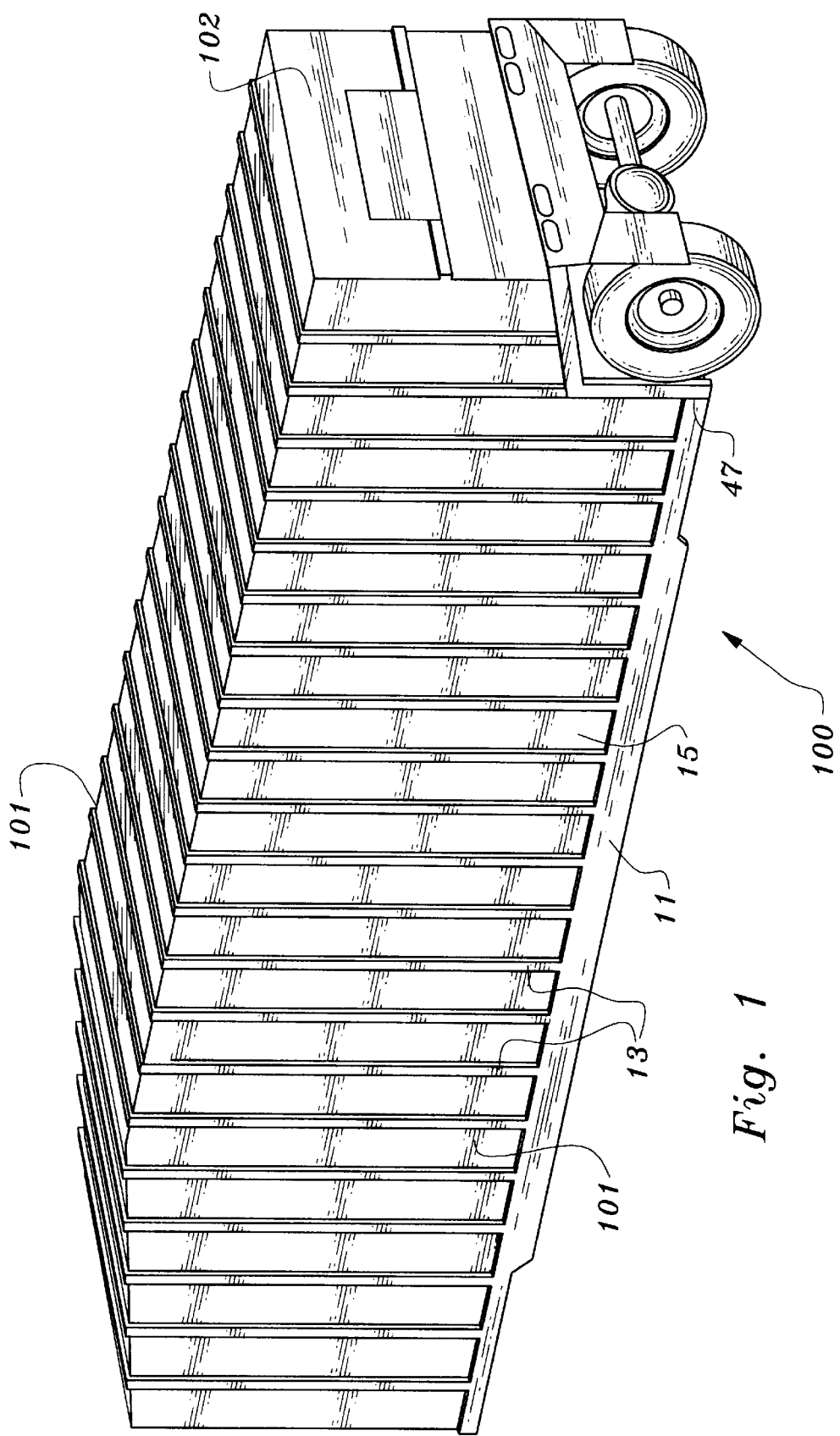
FIG. 1 is a partial perspective view of a mobile tank that incorporates the floor of this invention therein.

The discussion now turns to FIG. 1 wherein a typical mobile tank that incorporates the floor of this invention is seen. This tank designated 100 has a pair of opposed sides 101 and a rear wall 102, with the front wall not seen. Sides 101 are formed of sheet metal 15, reinforced by vertical girders 13, which girders are uniformly spaced apart. As will be seen in other figures, the girders and sheet metal rest on a floor rail 11. Attention is also drawn to weld line 47 which will be discussed infra, as will be the components forming the floor of the tank shown.

Figure 2:
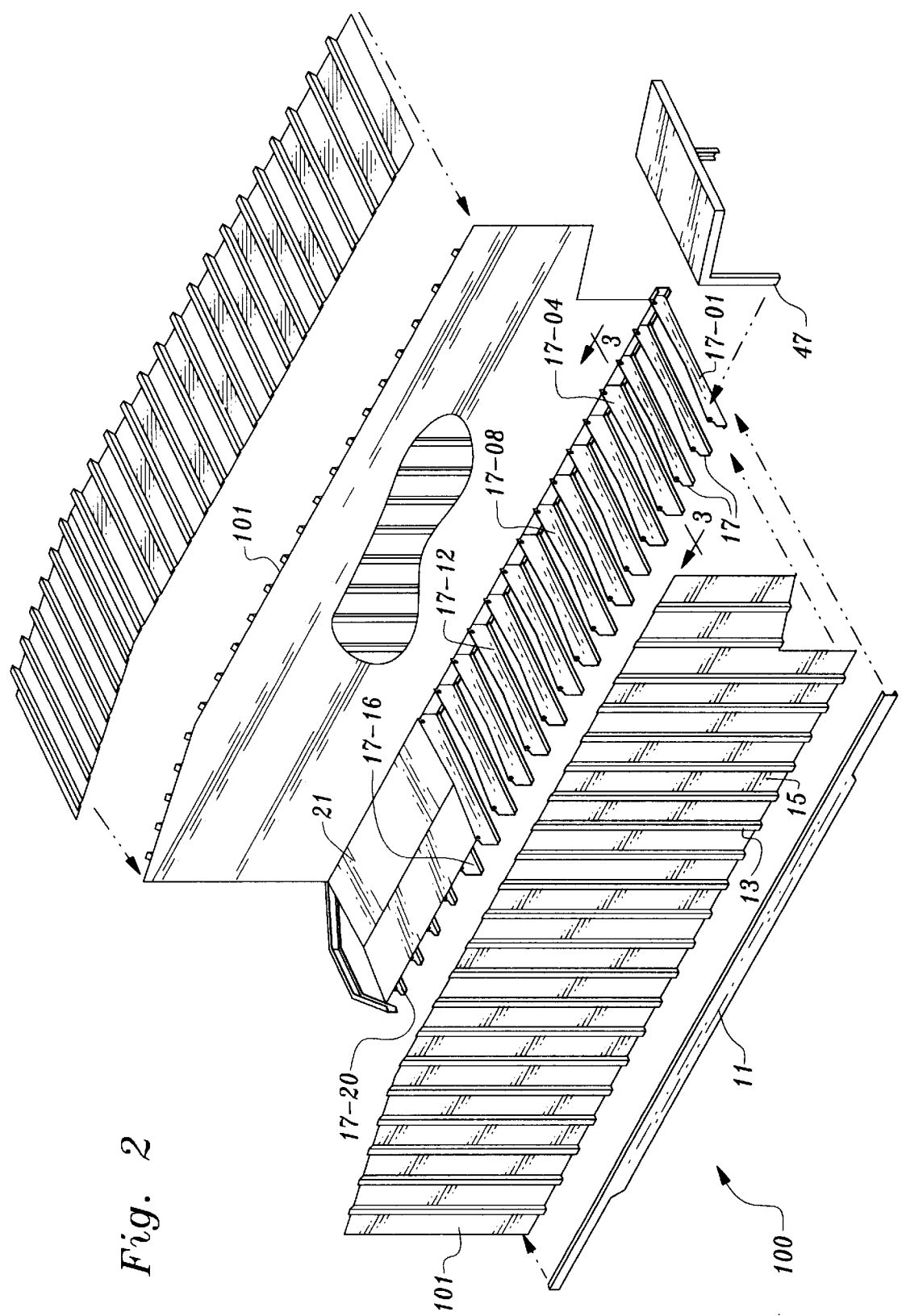
FIG. 2 is a top perspective exploded view of the interior of a mobile tank showing the superstructure of this invention.

FIG. 2 is an exploded view showing the right floor rail, 11 and the plurality of spaced struts, 17, which, in conjunction with the left floor rail, not seen, form the superstructure 18, over which lies the V-shape skin 21. The skin 21 which serves a a flowing surface is welded or otherwise attached to each separate strut. As can be seen in FIG. 2, there are 20 uniformly spaced and aligned struts. These struts are placed in alignment between the two side rails in a spaced arrangement such that the top edge of the struts are positioned in a declining elevation between the two floor rails. Reference is made to FIG. 3.

Figure 8:
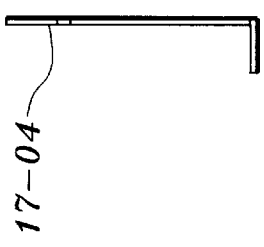
FIGS. 7 and 8 are front and end views of the $4^{th}$ strut employed in the floor of this invention.
Figure 7:
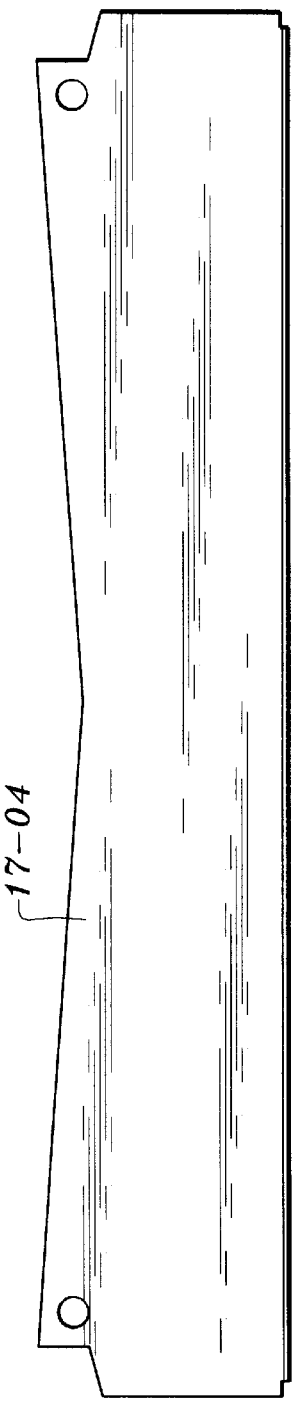
Figure 9:
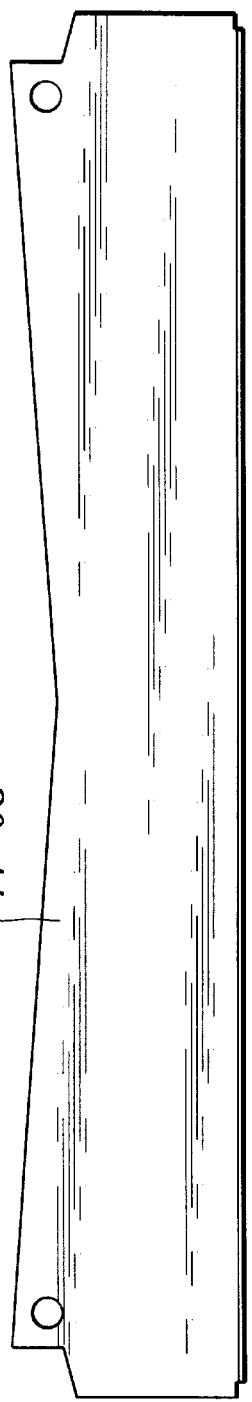

The term effective height is used to define the relative placement of the height of the struts to achieve the forward and central fluid flow, because the actual elevation of the struts is such that the first strut though its top edge is highest positioned, is itself shorter than some of the other struts such as strut 4, due to its placement above the cutout for the rear wheels of the tank. In point of fact the physically tallest strut is strut 4 which is positioned just ahead of the rear wheel area. Reference is again made to FIGS. 7 and 8.

Several of the individual struts will be discussed more specifically infra. Therefore the discussion skips momentarily to FIG. 13, where the blank 16 for the first strut 17; namely, 17-01 is seen. Each strut includes the flange section 23 of an elongated rectangular configuration. This flange extends upwardly from the lower edge of the blank 16 to an imaginary bend line 24, and it is spaced slightly inwardly from the side extremities of the main portion of the strut. This indentation is configured as a rectangular notch 26. See the figure. This notch 26 extends upwardly from the lower edge of flange 23 slightly above the imaginary bend line 24. The purpose for the extra elevation of the rectangular notch 26 will be readily understandable from the discussion to follow with respect to FIG. 3. Each blank to be formed into a strut also includes an upper notch 27 at each of the right and left corners, which comes into play during assembly of the mobile tank itself Each strut is seen to be preferably approximate 96 inches wide. Two opposed upper notches 27 are formed by making a vertical cut approximately two inches in from the side of the blank vertically about six inches, followed by a cut slightly greater than 90 degrees from the termination of the vertical cut to the respective left or right side edge of the blank 16. The location of each of the vertical cuts for the upper notches is designated 28.

A V-trough is cut from or otherwise removed from the upper surface of the blank 16, said trough extending from the cut point 28 of each of the upper notches to the center of the blank 16. The obtuse angle 30 of this V cut 29 could be made to vary in each of the struts of the series of struts from one end of the tank to the other end of the tank, if desired, but it has been found that adequate flow can be obtained by the use of a single angle for each of the struts, and merely lowering the elevation of each strut relative to the side rails to ensure flow both from the sides toward the center of the tank and from the rear end, where strut 17-01 is located toward the front end where strut 17-20 is located.

Figure 10:
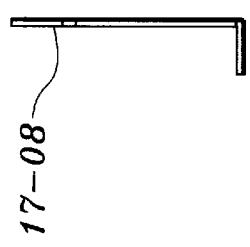
FIGS. 9 and 10 are front and end views of the $8^{th}$ strut employed in the floor of this invention.
Figure 17:
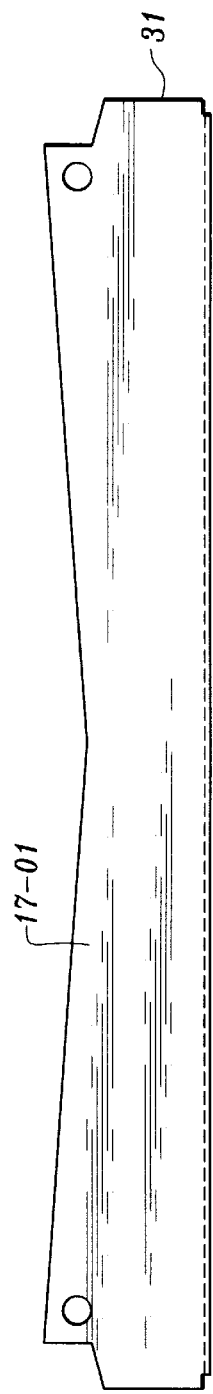
FIG. 17 is an elevational view of the first and rearmost strut formed from the first strut blank shown in FIG. 13.

After a bend is made along line 24 in a metal brake or other suitable machine the blank 16 is converted to, in this case, strut 17-01. See FIG. 17. This previously discussed bend can be readily discerned with respect to the formation of the flange by a viewing of several struts; namely struts 17-08, 17-12 and 17-16 shown in FIGS. 10, 12, and 15 wherein the main body thereof, 25 is shown in an elevated disposition while the flange 23 is shown in a horizontal disposition.

Reference is now made back to FIG. 3. Here, the fourth strut designated 17-04 is seen at rest within the channels 11C of each of the floor rails 11. The center section 11B abuts the sidewall of the strut. Each strut 17 such as 17-04 and others to be discussed are similarly disposed.

A careful inspection of FIG. 3 reveals that a small portion of notch 26, can still be seen in the now formed strut 17-04, to the left and to the right of the bend line 24, which bend line is now in fact the lower edge of the strut. The lower arm 11A of the channel 11 and the upper arm of the channel are triangular in cross section, and by having the notch 26X, a clearance for the extra thickness of the arm 11A adjacent the center section 11B is obtained. Thus the center section 11B can as noted abut the sidewall of the strut and the arm 11A can have the flange 23, not visible, rest thereupon.

Meantime, the upper arm 11B overlies the upper notch. As noted earlier the upper notch 27 is cut on an oblique angle greater than 90 degrees, again to accommodate the cross section of commercially available channels. Since the upper notches 27 extend inwardly further than the notch portions 26X, rail 11 can maintain a vertical disposition while still permitting the placement of the sheet metal sidewall 15 behind the floor rail, from point 28 along the indented edge 28L of the strut.

The V-skin 21 is seen to be overlaying and conforming to the V-trough of this particular strut as it does with all of the struts. The V-skin serves as the flooring surface of the tank floor.

While in FIG. 3, strut 17-04 is depicted, all of the struts are constructed in like manner, save for the elevation 31, of the particular strut, and are associated with the floor rail in the manner discussed with respect to strut 17-04. The caveat being that the V-skin is welded to the V-trough of each successive strut such that it, 15, tapers inwardly from the two extremities of the struts. If desired at significantly increased manufacturing cost, the V trough can also vary in angle from the narrowest obtuse angle for strut 17-20 at the front to the widest at strut 17-01 at the rear. Though such extra work could over increase the speed of flow beyond the capacity of the exit valve not seen.

FIG. 4 is a rear corner perspective view taken at a point in time during the manufacture of the mobile tank in which the floor of this invention is to go. This view illustrates the continuing reduction in elevation of the series of struts because the elevation of the floor rail 11, stays constant.

Reference is now made to FIGS. 7, 9, 11, and 14 as well as to FIGS. 8, 10, 12 and 15 which depict the formed struts 17-04, 17-08, 17-12 and 17-16 respectively both in elevational views and side views. In each instance the elevation of the sidewall or main portion 25 of the respective strut can be seen to be slightly different.

Figure 6:
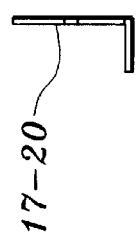
FIG. 6 is an end view thereof
Figure 5:
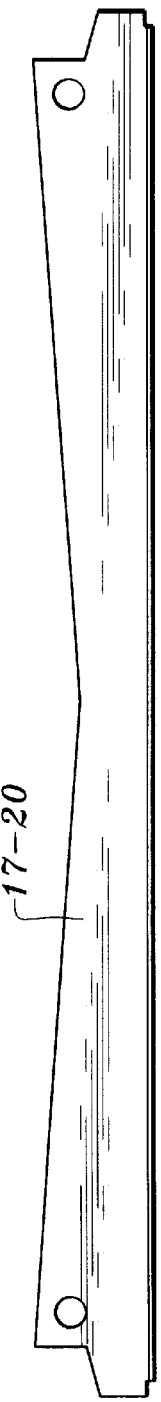
FIG. 5 is a front elevational view of the 20th and most forward strut used in the floor of this invention.
Figure 16:
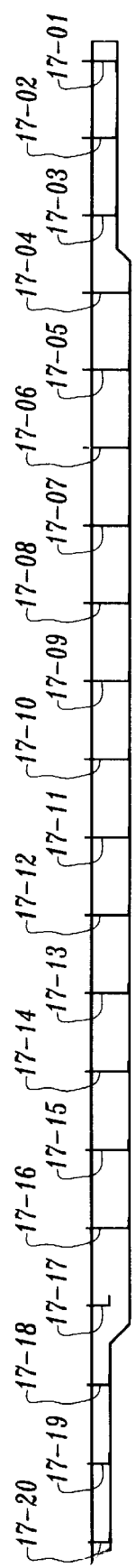
FIG. 16 is a diagrammatic view of a side rail used in the formation of the floor of this invention.

Reference is now made to FIGS. 4 and 15 as well as FIGS. 7, 9, 11 and 14. From the last figure it is seen that there are front and rear cutouts 12 in the floor rail 11. The front cutout for the placement of the fifth wheel to couple the mobile tank to a source of motive power. The rear cutout 12 is for the suspension and wheels of the unit. See FIG. 1. From FIG. 16, where the dashed lines represent the main body of the respective strut, it is seen that the location of the spaced strut 17 is denoted in sequence as #1 the rear, far right to #20, the most forward at the far left. From FIG. 4, one notes that the EFFECTIVE height of strut I seems to be the greatest, as the space between the V-skin 17 and the top of the rail 11 appears to decrease as the eye moves forwardly from strut #1 to strut #20. But effective height relates to physical placement, not actual height. Compare the outside sidewall elevation 31 of strut #1 of FIG. 13 with the elevation of the sidewall 31 of strut #4 and the other shown struts. (Remember that the upper notch size on all struts is the same.) Thus it can now be appreciated that due to the relative placement rear to front that while the EFFECTIVE height of #1 is the greatest, in point of fact the actual height or elevation of the sidewall 31 of strut #4 is the largest in dimension and that #1 is less than #4. In the layout of FIG. 16, struts 1, 2, 3 and 17, 18, 19 and 20 are all physically reduced due to the presence of the cutouts. Further, from FIG. 16 it is seen that for struts not located vertically adjacent a cutout, that actual height of the struts descends from #4 down to #16 and that the effective height is maximum at position #01. Reference is now made to FIG. 5 and FIG. 6, which show the front and side elevational views of the most forward strut #20. This strut has not only the least effective elevation relative to the others in placement, but being over the front cut out where the fifth wheel attachment is disposed on the tank, it has the shortest actual elevation. Since all parts of the strut are the same as for the first strut of FIG. 13, they need not be discussed in full. Note however that as short as it is the horizontal extension of the flange 23 is still the same.

The tank 100 for which the floor of this invention is intended as noted can for the most part be seen in FIG. 1. The skin or actual sidewalls 15 are reinforced by the spaced vertical girders, 13. The tanks include a reinforced rear wall 102 as well as a front wall not seen, a wheeled axle, and a mount section that is disposed in the area of the front cutout area. The interior floor above the wheels slopes forwardly as can be seen from FIG. 1. In this first figure, a line 47 which constitutes the weld heat line horizontally for the sheet metal disposed upon the upper edge of each strut to the sidewall 15. Such line supports the position of the descending effective elevation of the struts discussed in detail supra.

Previously it has been mentioned that positive flow in two directions toward a front central located exhaust valve can be had by merely changing the effective elevation of the various members of the series of struts coupled with the V shape of the skin forming the bottom wall of the tank. Thus reference is made to several struts positioned between the $5^{th}$ wheel cut out and the rear wheels; namely struts 4, 8, and 12, seen both in front elevational and side elevational views in FIGS. 7 & 8, 9 & 10, and 11 & 12. In all of these the actual elevation is denoted by the designator 81. This actual elevation is seen to be decreasing as the strut number increases. Again see FIG. 16 for the effective elevation based on placement.

It is also within the scope of this invention to (I) vary the obtuse angle of the V-skin 21 from ultra wide to a narrower angle while maintaining the same elevation of all members of the series of struts. It is also within the scope of this invention to (II) vary the elevation of the various members of the series of struts, as is described with respect to the preferred embodiment, as well as to alter the angle of the V-trough. It is believed that higher construction costs would arise from embracing either of the modes of construction (I) or (II). This is so because in the preferred embodiment all notches are cut from but two dies, one for the series of rectangular notches at the bottom and one for the upper notches for all members of the series of struts 17-01 to 17-20. In addition, only one setting need be made for the V-trough cuts.

Now having described the floor of this invention, a review of FIG. 1 to note the weld line aforementioned is in order. This weld line 47 is the result of the heat generated when the sheet metal of the flooring 21 seen in FIGS. 2 and 4 is welded to the side wall of the tank to seal the compartment formed by the side walls and the floor, with the front and rear walls. Note the presence of optional indicia 80, the large numeral 1, to identify the struts in order during the course of assembly of the floor such as to avoid mixups in placement. This same 80 indicia shows up in FIG. 3 to identify strut #4.

It is seen that there has been provided a preferred mode of ensuring the total evacuation of a mobile tank. This is accomplished by having a forwardly declining effective elevation of the spaced struts covered over by a metal skin. It is also to be seen that a plastic V-skin may be desired for certain purposes, such as for potable water or because of an interaction between metal and a potential fluid to be carried by the tank. Both plastic layers for the sidewalls 15 and the V-skin, either as the flooring surface alone or as an overlay or over coating are contemplated by this invention.

It is also seen that there has been provided a mobile tank floor that can be built at relatively low cost, with a minimum amount of labor, and which is easy to assemble. The possibility of retrofitting preexistent flat floor tanks is also envisioned. Such an activity would require the torch cutting away of the pre-existent floor and the disposition and welding of the tank carcass of side and front and rear walls to the floor of this invention. Such a procedure would however be relatively costly.

While not seen in the drawings, exhaust valves for placement on tank floors or in the front wall adjacent the floor to empty the contents of the tank are conventional and readily available in the marketplace.

Though the tank floor of this invention is primarily intended for use in mobile tanks, it can be just as easily utilized in stationary tanks as well.

Since certain changes may be made in the above described apparatus without departing from the scope of the invention herein involved, it is intended that all matter contained in the above description and shown in the accompanying drawings shall be interpreted as illustrative and not in a limiting sense.

What is claimed is:

1. A mobile tank, having a pair of wheels on an axle at the rear and a hookup means to a source of power on the front, said tank having front and rear walls and spaced sidewalls and having a tank floor, wherein the tank floor has a front and rear and which floor comprises: a pair of spaced elongated floor rails and a spaced series of struts normally disposed thereto, each of said struts having a V-trough therein, and being overlaid by a V-skin, which serves as the flooring surface, the effective height of said series of struts declining from the rear of the tank toward the front of the tank and wherein each of the struts includes a pair of opposed notches adjacent the V-trough.

2. The mobile tank of claim 1 wherein the elongated floor rails are channel shaped, and both floor rails include front recess for a power hookup in the front, and a bank recess for a wheeled axle in the rear, and each strut includes a mounting flange normally disposed to the main body of the strut.

3. The mobile tank of claim 2 wherein the sidewalls comprise a sheet metal skin, with spaced vertical girders on the exterior thereof.

4. A mobile tank floor having a front and a rear, comprising a pair of spaced elongated floor rails and a spaced series of struts normally disposed thereto, each of said struts having a V-trough therein, and being overlaid by a V-skin, which serves as the flooring surface, the effective height of said series of struts declining from the rear of the tank toward the front of the tank, wherein each of the struts includes a generally rectangular flange normally disposed to the main body of the strut, and each strut includes a pair of opposed notches adjacent the V-trough.

5. The mobile tank floor of claim 4, wherein the side edges of the mounting flange are disposed slightly inwardly from each side of the main body of the strut.

6. The mobile tank floor of claim 4 wherein the elongated floor rails are channel shaped.

7. The mobile tank floor of claim 6 wherein both channels include a pair of spaced triangular configured arms attached to a center section normal to each.

8. The mobile tank floor of claim 4 wherein there are 20 spaced struts, and the effective height declines from strut #1 toward strut #20, but wherein the strut with the largest actual height is strut #4.

* * * * *